United States Patent
Luckenbill et al.

[15] 3,669,475
[45] June 13, 1972

[54] COMPRESSION COUPLINGS

[72] Inventors: Lawrence F. Luckenbill; Frank C. Hackman, both of Decatur, Ill.

[73] Assignee: Mueller Co., Decatur, Ill.

[22] Filed: May 22, 1970

[21] Appl. No.: 39,706

[52] U.S. Cl. ................................ 285/348, 285/369, 285/404
[51] Int. Cl. .......................................................... F16l 21/02
[58] Field of Search ......................... 285/286, 348, 404, 369

[56] References Cited

UNITED STATES PATENTS

| | | | |
|---|---|---|---|
| 2,650,840 | 9/1953 | Risley | 285/348 X |
| 2,861,822 | 11/1958 | Risley et al. | 285/348 |
| 1,600,561 | 9/1926 | O'Connor | 285/404 X |
| 3,028,180 | 4/1962 | Smith | 285/404 X |
| 3,159,414 | 12/1964 | Widman | 285/348 |

FOREIGN PATENTS OR APPLICATIONS

| | | | |
|---|---|---|---|
| 720,208 | 12/1931 | France | 285/286 |
| 1,260,714 | 4/1961 | France | 285/286 |
| 960,664 | 6/1964 | Great Britain | 285/404 |
| 328,115 | 7/1935 | Italy | 285/404 |

*Primary Examiner*—Thomas F. Callaghan
*Attorney*—Cushman, Darby & Cushman

[57] ABSTRACT

A fabricated pipe coupling for connecting meeting ends of a pair of pipe sections, the coupling including a tubular member rolled from steel to form a cylindrical center portion having outwardly flaring portions at each end thereof, the outwardly flaring portions being provided with cylindrical end portions to define a gasket and follower channels. Rigid end rings which define end flanges are welded to the tubular member for entrapping the followers and the gaskets in the channels. Each follower ring is endless and rigid and is inserted into the chamber prior to enclosing the chamber with the end ring. The end rings have a plurality of circumferentially spaced thread holes for receiving set screws, the set screws being utilized to advance the follower rings against the gaskets to cause the gaskets to deform and provide seals with the end of the pipe sections. A further reinforcing sleeve member is provided about the tubular member and is welded to the tubular member and to the end rings.

1 Claim, 3 Drawing Figures

PATENTED JUN 13 1972 3,669,475

INVENTORS
LAWRENCE F. LUCKENBILL
FRANK C. HACKMAN

BY Cushman, Darby & Cushman
ATTORNEYS

COMPRESSION COUPLINGS

The present invention relates generally to improvements of pipe couplings for connecting the meeting ends of a pair of pipe sections. More particularly, the present invention relates to a pipe coupling which may be utilized in joining together pipe sections, the pipe coupling being fabricated from steel by rolling the tubular cylindrical body portion to form annular gasket and follower channels at the ends thereof, such annular channels receiving elasto-meric gaskets and endless follower rings, the follower rings being entrapped in the channels by rigid end rings welded to the body or tubular member.

BACKGROUND OF THE INVENTION

In the past, pipe couplings for connecting meeting ends of pipe sections have been made with cast bodies, the cast bodies being provided with annular chambers at each end to receive elastomeric gaskets and follower rings for deforming the gaskets. In such instances, the follower rings were split follower rings that were contracted to permit insertion into the chamber and then were released so that they expanded into the chamber. When such follower rings were advanced against the elastomeric gaskets to deform the same, there was a flow of gasket material between the ends of the split ring which oftentimes caused the split ring to expand further outwardly until it was in engagement with the peripheral wall of the chamber, this causing binding of the same affecting ultimate sealing of the coupling. Even if there was no binding of the follower ring, there was often creep or cold flow of the elastomeric gasket through the space between the ends of the same after the gasket had set a certain period of time, thus resulting in a weakening of its sealing characteristics. To overcome this, efforts were made to weld the ends of the follower ring once it had been inserted into the channel and this was a costly, difficult and many times unsatisfactory operation, as weld could not be easy ground flush to provide a continuous gasket engaging surface on the follower ring.

More recently, efforts have been made to fabricate a pipe coupling by rolling the main body portion to form the full channels or an annular member was welded on the end of a body member, the annular member being channel shaped in cross section and of substantially the same thickness as the main body member, but again, the follower ring had to be split so that it could be inserted into the chamber. In this type of construction the flanged end supporting the set screws for advancing the follower ring was inherently resilient rather than rigid for the purpose of maintaining pressure constantly on the follower ring, but such arrangements were not particularly satisfactory where large diameter pipes were being coupled, as the pressure needed to exert a proper force on the follower ring to provide a seal oftentimes caused fracture of the weld or permanent binding of the channel section.

More recent efforts have been made to make pipe couplings wherein solid follower rings were used for deforming the gaskets and these couplings have been fabricated from plate steel rolled into a cylindrical tubular form and welded longitudinally. In these arrangements, machining of the chambers at the end of the body member was necessary and it was also necessary to insert an initially split ring with the free ends overlapped to contract the ring for insertion. Once the ring was inserted, the ends of the same had to be welded and as mentioned above, such an arrangement was costly and time-consuming because of the limited space in which the welding operation took place.

Prior art arrangements of pipe couplings of the type discussed above may be found in the following United States patents:

| Number | Name | Date |
|---|---|---|
| 2,650,840 | Risley | Sept. 1, 1953 |
| 2,747,900 | Smith | May 29, 1956 |
| 3,028,180 | Smith | Apr. 3, 1962 |

BRIEF SUMMARY OF THE INVENTION

The present invention involves an improved fabricated pipe coupling for use, especially in large diameter pipes, the pipe coupling comprising a tubular body member of uniform wall thickness rolled from steel to form an intermediate cylindrical portion with outwardly sloping walls at each end thereof terminating in cylindrical end portions. Each sloping wall with its respective cylindrical portion defines an outwardly opening annular channel. A rigid endless follower ring of a diameter slightly less than the diameter of the channels is inserted into each of the channels and then a rigid annular end ring is welded to the cylindrical end portions of the tubular body member to entrap the follower rings in the channels. An elastomeric gasket is inserted into each of the channels between the follower ring and the sloping wall thereof after the welding operation. A plurality of set screws threaded through circumferentially spaced bores in the end rings are utilized for engaging the follower rings to advance the same against the elastomeric gaskets so as to deform the elastomeric gaskets into a sealing relationship between the tubular member and the pipe sections. The threaded bores for the set screws extend through the end rings in an inwardly and downwardly direction, so that when the set screws are advanced, the relative point of contact between the set screws and the follower rings moves radially inwardly.

In order to further reinforce the tubular body member and the rigid end rings, a cylindrical sleeve member of a greater axial length than the body member fits over the body member and is welded thereto, so that the coupling has a double wall section. The sleeve member is also welded to the end rings, to further support the end rings rigidly with respect to the overall arrangement. By providing a cylindrical sleeve member for reinforcing the body member formed by rolling against bending, the wall thickness of the body member may be made thinner, thus the rolling operation may be more easily accomplished at less cost. Additionally, the double wall design not only reduces the cost in forming the rolled member, but it makes the coupling easier to wrap after the coupling has been installed to couple together pipe sections.

The improved fabricated pipe coupling of the present invention eliminates the necessity for sizeable cash outlays for equipment to produce different size couplings, as all parts of the coupling, including the gasket, can be "cut to length" and the rolling equipment for forming the tubular body member has the necessary adjustments for varying the diametral size quite easily. Additionally, by providing a fabricated coupling wherein an endless follower ring may be inserted during fabrication, the follower ring may be initially made from a split ring welded together, the weld being ground flush in the surface area which engages the gasket so that there will be uniform deformation of the gasket when the follower ring is advanced.

BRIEF DESCRIPTION OF THE DRAWINGS

FIG. 4 is a fragmentary longitudinal sectional view similar to FIG. 2, but of a modified fabricated coupling not embodying the double wall construction.

DETAILED DESCRIPTION OF THE INVENTION

Figure 1:
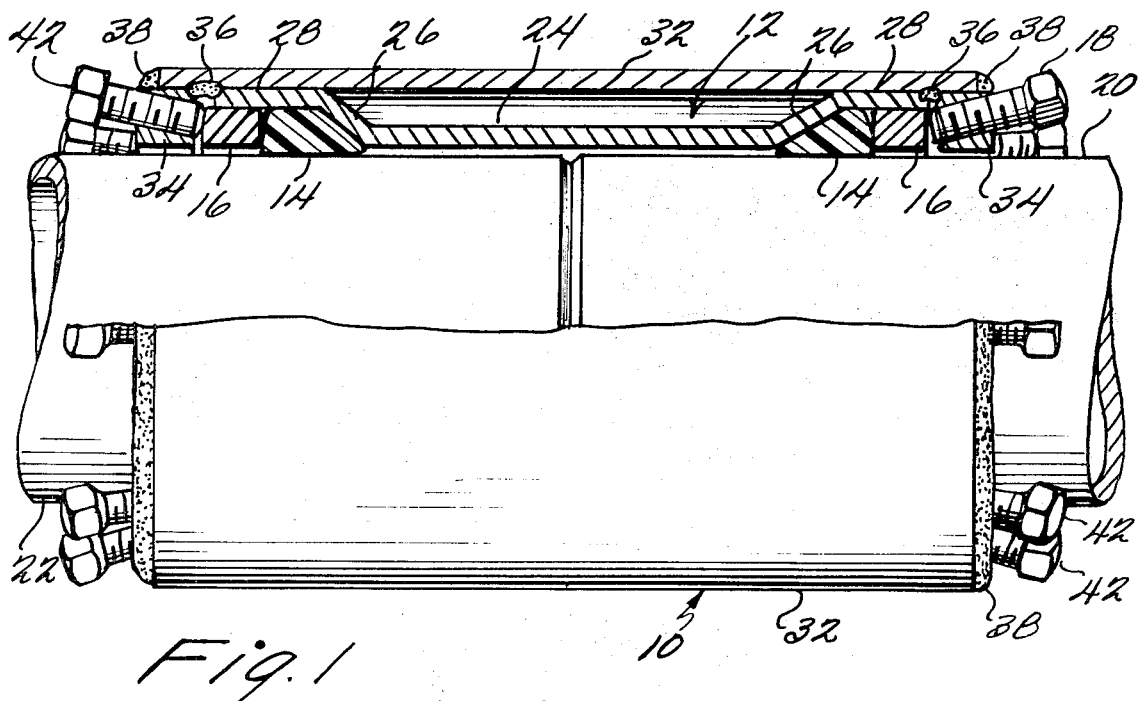
FIG. 1 is a side elevational view of the fabricated pipe coupling of the present invention, the view being partially broken away in longitudinal cross-section to better disclose the invention.
Figure 2:
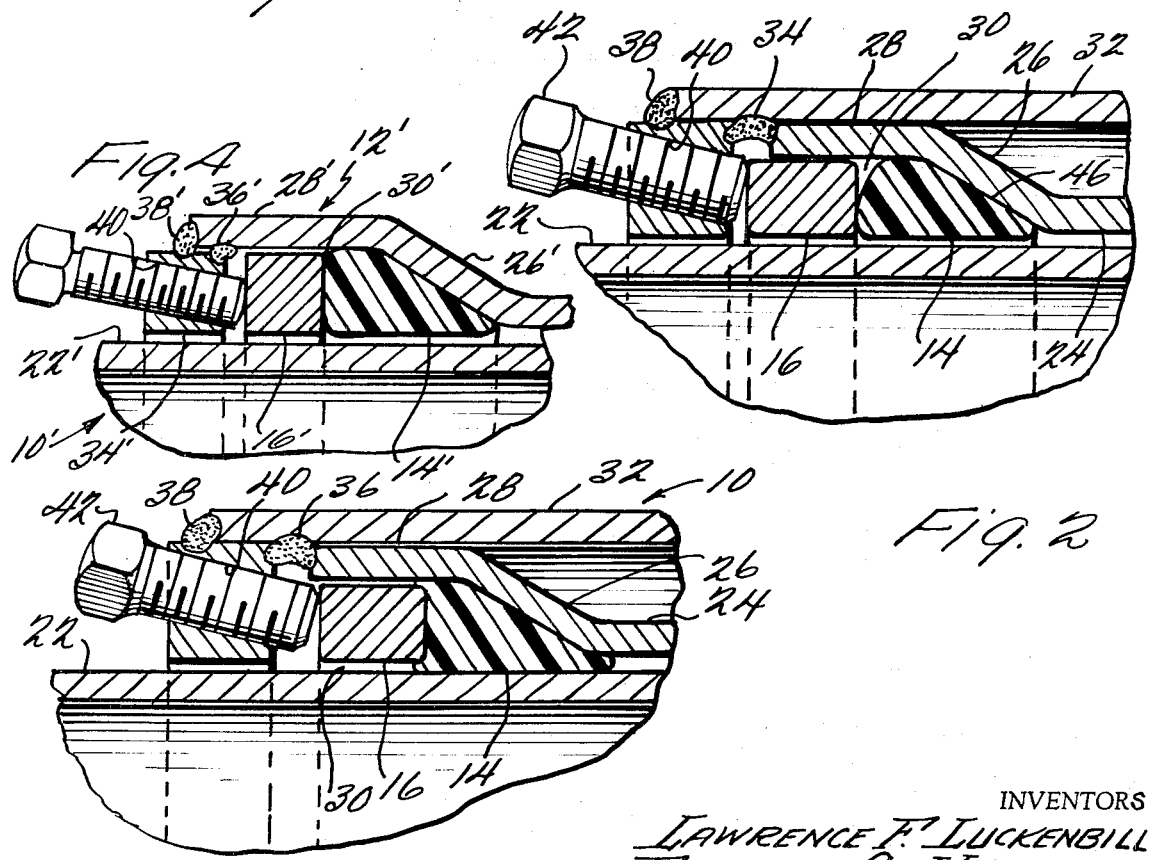
FIG. 2 is an enlarged fragmentary longitudinal cross-sectional view of the couplings of the present invention illustrating the various parts and showing the welding of the same.
Figure 3:
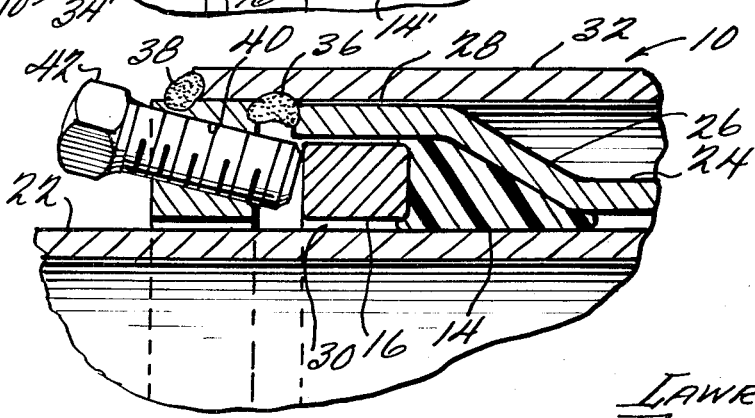
FIG. 3 is a fragmentary sectional view similar to FIG. 2 but illustrating the follower ring after it has been advanced against the gasket by the set screws.

Referring now to the drawings wherein like character or reference numerals represent like or similar parts, and in particular to FIGS. 1–3 inclusive, there is shown the fabricated pipe coupling of the present invention, the same being generally designated at 10. Since both ends of the pipe coupling are identical, the description will be primarily to one end. The pipe coupling 10 broadly includes an elongated body member generally designated at 12, an annular elastomeric gasket 14 and a follower ring 16 positioned at each end of the body member, and set screws 18 for advancing each of the follower rings 16 against the respective gasket 14. The body member 12 is arranged to receive a pair of pipe sections 20 and 22, to be coupled to the pipe sections fitting into respective ends of the body member 12 past the gaskets. Usually the pipe sections abut, although this is not necessary. Pipe couplings may be made in sizes to receive pipe sections 20 and 22 which range in diameter from 2 inches to 120 inches; however, the fabricated pipe coupling 10 of the present invention is particularly desirable for use with larger diameter pipe sections, such as those from 12 inches to 120 inches in diameter.

The tubular body member 12 is fabricated from a piece of flat stock steel, the flat stock steel being formed first into a cylinder of a diameter just large enough to receive a particular size of pipe, while still allowing for tolerances in the exterior of the pipe. The abutting edges are welded longitudinally of the same. The longitudinal weld of the cylinder is ground to remove the excess material of the weld from the interior and exterior surface and then cylinder shell thus formed is roll-formed at each of its ends to provide a cylindrical intermediate or center portion 24, outwardly sloping wall portions 26 at each end of the intermediate cylindrical portion 24, the sloping wall portions 26 being provided at their outer ends with a cylindrical end portion 28. The interior surface of each sloping wall portion 26 and the respective cylindrical end portion 28 defines an annular outwardly open channel 30 for reception of the elastomeric gasket 14 and the rigid endless follower ring 16. When the tubular body member 12 has been fabricated into its final form, it will be noted that the wall thickness of the body member is substantially uniform throughout, this wall thickness depending upon the size of the pipe sections to be coupled.

The endless annular steel follower ring 16 is rectangular in cross-section and has an interior diameter substantially the same as the interior diameter of the intermediate cylindrical portion 24 of the tubular body member 12 and thus, it can slide freely along the exterior of the pipe section 22. The complete fabrication of the endless follower ring 16 is accomplished prior to its insertion into the channel 30. In this respect, a spiral wound piece of stock having a suitable cross-sectional size is cut to proper length to provide the proper interior diameter and exterior diameter for the ring. The ends of the piece cut from the spiral stock are then made to abut and are welded. Once the weld has been made, it is ground flush with the surfaces of the follower ring 16, especially on the wall surface which will abut the elastomeric gasket 14. The weld on the other surfaces of the follower ring 16 is also ground smooth so that there will be no interference with the exterior surface of the pipe or with the interior surfaces of the cylindrical end portion 28 when the follower ring is advanced.

A steel cylindrical reinforcing sleeve member 32 is fabricated from a piece of flat stock steel by rolling the same into its cylindrical shape and welding it along its longitudinal abutting edges. The reinforcing sleeve 32 has an axial length greater than the axial length of the tubular body member 12 and an interior diameter at least as great as the exterior diameter of the cylindrical end portions 28.

In order to enclose the outer open end of the channel 30, a rigid annular end ring 34 made of steel is provided, the end ring being generally rectangular in cross-section and having a radial and an axial thickness greater than the wall thickness of the body member 12 or the reinforcing sleeve member 32. The annular reinforcing ring 34 is fabricated in a similar manner to the follower ring 16 in that it is made from spiral wound stock, the same being cut to proper length and its abutting ends welded and suitably ground. In its finished form, the endless end ring 34 has an exterior diameter substantially equal to the interior diameter of the reinforcing sleeve member 32 so that a portion of the ring may be received in the same. The interior diameter of end ring 34 is substantially equal to the interior diameter of the follower ring 16 and slightly greater than the exterior diameter of the pipe section 22.

In fabricating the pipe coupling 10 from the parts described above, the follower ring 16 is positioned in the annular channel 30 and is slid as far inwardly as possible, i.e. against the sloping wall portions 26. This is possible since the elastomeric gasket is the last part assembled. When the follower ring 16 has been so positioned, then the rigid annular end ring 34 is at least partially positioned within the overhanging end portions of the reinforcing sleeve 32, as shown in FIG. 1. The ring 34 then is welded to the cylindrical end portion 28 of the body member 12 and also to the reinforcing sleeve member 32, as indicated at 36. A second weld 38 is provided between the end ring 34 and the reinforcing sleeve 32 about the exterior of the same. Once the welding has been completed, the endless follower ring 16 is permanently entrapped in the channel 30 but can still slide axially of the same. The end ring 34 defines an inwardly extending annular flange. However, because of the cross-sectional shape and dimensions of the end ring 34, as compared to the wall thickness of the cylindrical reinforcing sleeve member 32, a very rigid construction results compared to that which would be obtained had the overlapping end portions of the sleeve member 32 been inturned to form the end flange.

After the end ring 34 has been welded in place, a plurality of circumferentially spaced threaded holes 40 are tapped in the same, the holes having an axis which extends inwardly and downwardly as shown. The tapped holes 40 are arranged to receive set screws 42, which have their inner ends abutting the follower ring 16. By having the tapped holes 40 extending inwardly and downwardly, the end of the set screw 42 engaging the follower ring 16 has a point of contact which will move radially inwardly as the follower ring 16 is advanced.

The elastomeric gasket 14 is made from rubber or rubber-like material and is capable of deforming upon application of pressure. The cross-sectional shape of the annular elastomeric gasket 14 is as shown in FIGS. 1 and 2. When in its relaxed position, it will be noted the gasket 14 is provided with a sloping wall 46 complementary to and for abutting the sloping wall portion of the annular channel 30. The gasket 14 is positioned in the channel 30 after all of the welding operations have been completed so that the heat therefrom does not damage the same. As shown in FIG. 2, the follower ring 16 is in a position just prior to being advanced on the gasket 14, whereas in FIG. 3, the set screws 42 have been advanced, moving the follower ring 16 inwardly and the gasket 14 is then deformed to provide a tight seal between the exterior wall of the pipe section 22 and the interior surface of the tubular member 12, along the sloping wall 26 and a portion of the cylindrical end wall 28.

By providing the double wall construction of pipe coupling, such as illustrated in FIGS. 1-3, the wall thickness of the tubular body member 12 may be less than is necessary when there is only a single wall construction. This makes the forming of the end shapes by rolling easier, and the strength of the coupling against bending is increased, due to the reinforcing sleeve member.

FIG. 4 discloses a modification of the pipe coupling of the present invention where there is only a single wall construction. Similar elements to those previously described will be given primes.

The arrangement of pipe coupling 10' is similar in that a tubular body member 12' is provided, the body member 12' having sloping wall portions 26' and cylindrical end portions 28'. The elastomeric gasket 14' and the follower ring 16' are similar to those previously described, as are the end rings 34' but in this instance, the end rings have an outside diameter substantially equal to the inside diameter of the end portion 28' so that it may partially fit therein. In this instance two welds 36' and 38' are provided, both welds being between the body member 12' and the end ring 34'. The construction shown in FIG. 4 provides all of the advantages of the pipe coupling shown in FIGS. 1-3, with the exception of the double wall construction, and thus the uniform wall thickness of the tubular body member 12' must be slightly greater than that of the body member 12, in order to resist bending moment. The fabrication and assembly of the modification of FIG. 4 is substantially similar to that described above with respect to FIGS. 1-3, and, therefore, will not be repeated.

The terminology used in this specification is for the purpose of description and not limitation, the scope of the invention being defined in the claims.

What is claimed is:

1. A fabricated pipe coupling for connecting meeting ends of a pair of pipe sections, said pipe coupling comprising:

a tubular member having a uniform wall thickness, said tubular member being rolled from steel to form an intermediate cylindrical portion having an inside diameter sufficient to receive the outside diameter of the pipe sections, an annular outwardly sloping wall portion extending from each end of said intermediate cylindrical portion, and a cylindrical end portion extending axially from each sloping wall portion and having an inside diameter greater than the inside diameter of said intermediate cylindrical portion, each sloping wall portion and the cylindrical end portion extending therefrom defining an annular channel at each end of said tubular member;

a cylindrical reinforcing sleeve made from rolled steel and having an axial length greater than the axial length of said tubular member, said cylindrical sleeve member having an inside diameter at least equal to the outside diameter of each cylindrical end portion and a wall thickness at least equal to the uniform wall thickness of said tubular member, said cylindrical sleeve member being positioned concentrically about said tubular member with its ends overlapping the ends of said tubular member;

a rigid endless follower ring positioned in each annular channel of said tubular member and moveable axially with respect thereto, each follower ring having a smooth inwardly facing radially extending wall and having an inside diameter slightly greater than the outside diameter of the pipe sections and an outside diameter slightly less than the inside diameter of the cylindrical end portion;

a rigid annular end ring for each end of said cylindrical reinforcing sleeve member, said ring being approximately rectangular in cross-section and having an outside diameter slightly less than the inside diameter of said cylindrical sleeve member and greater than the inside diameter of the cylindrical end portion of said tubular member, each end ring being positioned partly within each end of said cylindrical sleeve member, a first weld welding said ring member to the end of said cylindrical sleeve member, a second weld welding said ring to the interior of said cylindrical sleeve member and to the end of said tubular member, each end ring closing the outer axial end of the respective annular channel to entrap the endless follower ring therein, each end ring having a plurality of tapped holes extending therethrough in an axial and inwardly direction;

an annular elastomeric gasket positioned in each annular channel between the sloping wall portion and the respective follower ring, said gasket having an inside diameter substantially equal to the outside diameter of the pipe section and a sloping wall complementary to and for abutting the sloping wall portion of the annular channel, each annular gasket having a radial wall for abutting the smooth inwardly facing radially extending wall of said follower ring:

and set screws threaded into said tapped holes for engaging each follower ring and advancing the same against its respective gasket to deform the gasket into seal engagement between the tubular member of the respective pipe section, said set screws having a point of contact with said follower rings which moves radially inwardly.

* * * * *